OSCILLATORY PULSE FORMING CIRCUIT
Filed Nov. 3, 1966
FIG. I
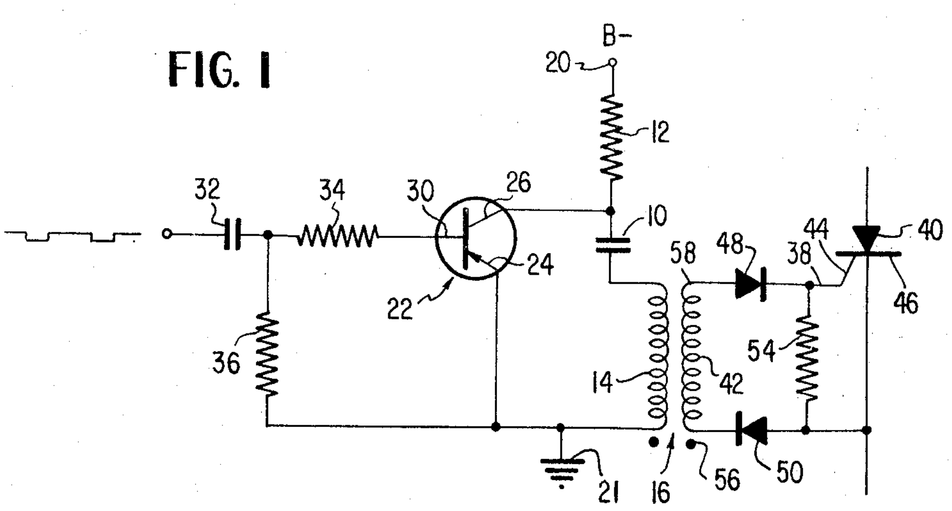
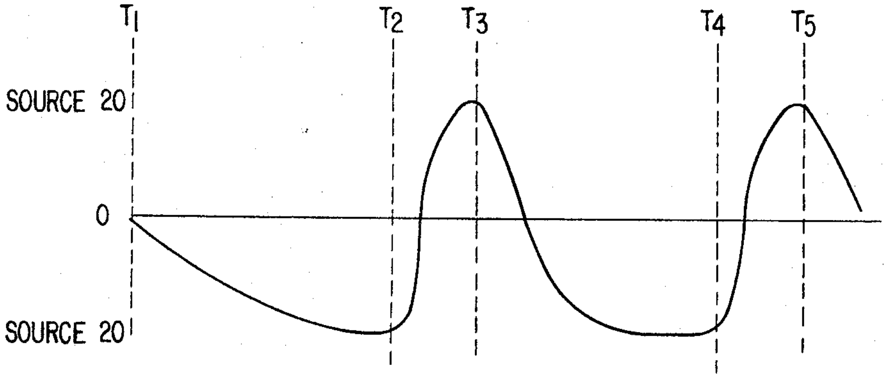
FIG. 2a
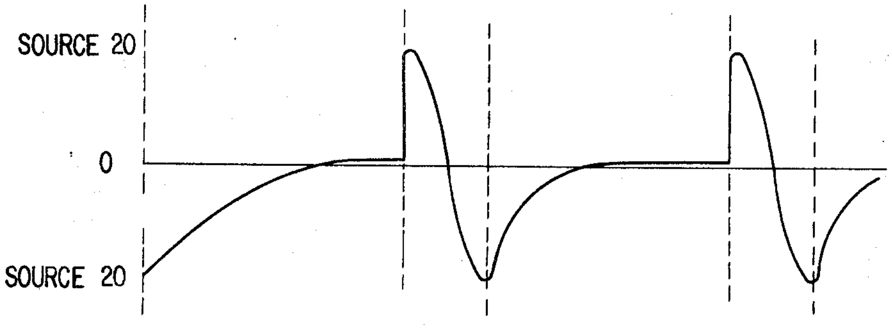
FIG. 2b
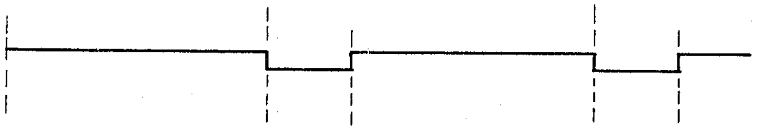
FIG. 2c
INVENTORS.
PAUL R. KINTZINGER
LESTER J. SMITH
BY McLean, Morton & Boustead
ATTORNEYS.

United States Patent Office 3,524,071 Patented Aug. 11, 1970

3,524,071
OSCILLATORY PULSE FORMING CIRCUIT

Paul R. Kintzinger and Lester J. Smith, Tulsa, Okla., assignors to Sinclair Research, Inc., New York, N.Y., a corporation of Delaware Filed Nov. 3, 1966, Ser. No. 591,773
Int. Cl. H03k *3/00*
U.S. Cl. 307—108 3 Claims

ABSTRACT OF THE DISCLOSURE

A pulse forming circuit comprising voltage storage means; a non-oscillatory circuit path for charging the voltage storage means; unidirectional switching means connected to the non-oscillatory circuit path to provide, when activated, an oscillatory circuit path for discharging the voltage storage means, the unidirectional switching means being connected to block all current flow in the oscillatory circuit path subsequent to the initial discharge half cycle from the voltage storage means; output means responsive to the discharge of the voltage storage means to produce a pulse upon an output terminal; and unidirectional current passage means connected to the output means to prevent the charging of the voltage storage means via the non-oscillatory circuit path from producing a pulse upon the output terminal.

This invention relates to a high efficiency electrical pulse forming circuit and, more particularly, to an electrical circuit wherein a conservation of power is achieved by the transformation of energy from the electrostatic state to the electromagnetic state during the generation of unipolarity output gating pulses.

Pulse forming circuits for the production of gating pulses to initiate operation of controlled switching devices generally are premised upon circuits of a differentiating nature wherein a previously charged capacitor is rapidly discharged through a low ohmic value resistor to produce a sharply peaking pulse desirable for gating operations. After the discharge period of the capacitor has expired, the capacitor is switched into its charging mode and the capacitor charge is replenished, usually through circuitry having a relatively high time constant, until the desired discharge voltage is obtained. The capacitor continues in its charged state until a next gating pulse is required to trigger a controlled switching device whereupon the rapid capacitor discharge again is effectuated.

Although resistive-capacitive differentiating circuitry of this nature is quite sufficient when the intermittent pulsing operation of the circuit is relatively far dispersed in time, it is extremely inefficient and economically costly in those situations when rapid pulse generating operation requires the continuous charging and discharging of the capacitive circuitry. Furthermore, the rapidity of consecutive pulse generation is limited by the relatively long capacitor charging time constant normally associated with resisitive-capacitive pulse generating circuits. Speed and efficiency of operation are especially important in situations when the pulsing circuitry is being utilized to control the sequential operation of a conversion system bridge rectifier unit.

It is therefore an object of this invention to provide a high efficiency pulse forming circuit wherein a portion of the capacitor charge is conserved during one pulse generating operation for subsequent operations. It is a further object of this invention to provide a pulse generating circuit capable of producing a series of output pulses in rapid sequence. These and other objects of this invention are accomplished by providing an oscillatory pulsing circuit wherein the capacitor charge, rather than rapidly being dissipated through a resistor, is transformed from the electrostatic state to the electromagnetic state to conserve a maximum portion of the electrical energy during each operation.

The pulse forming circuit of this invention basically includes a non-oscillatory circuit for charging a voltage storage device, e.g. a capacitor, and a low resistance oscillatory circuit for the discharge of the voltage storage device. Unidirectional controlled switching means connected in parallel across a portion of the non-oscillatory circuit provides, when activated, a closed oscillatory discharge loop for the voltage storage device, which loop includes that portion of the non-oscillatory circuit across which the unidirectional controlled switching means is paralleled. Upon the first half cycle of discharge current flow through the closed oscillatory loop, an output gating pulse is generated by the pulse forming circuit and electrostatic energy stored in the capacitor is converted to electromagnetic energy within the inductive elements of the oscillatory loop. The unidirectional controlled switching means functions both as a current block to prevent all successive oscillations of current flow in the oscillatory loop subsequent to the initial discharge half cycle of the voltage storage device and as a current bypass to prevent charging of the voltage storage device during the period of activation of the controlled switching means. Upon termination of conduction of the controlled switching means, the voltage storage device is charged rapidly through the non-oscillatory circuitry assisted by the energy electromagnetically stored within the inductive elements of the circuitry with the generation of output pulses of an opposite polarity during the non-oscillatory charging internal being inhibited by blocking means connected to the output means.

For maximum efficiency and speed of operation, the pulse width of the gating signal controlling the operation of the controlled switching means should be less than or equal to approximately one-half the period of oscillations of the closed loop utilized for energy transfer. In those situations when the gating pulse width is greater than one-half the period of the closed loop oscillations, the circuit switching speed and efficiency are affected adversely unless means, e.g. a blocking capacitor and resistor serially connected between the gate input terminal and the controlled switching means, are employed to limit the period of application of the gating pulse to the controlled switching means.

For a more complete understanding of the basic principles of this invention, reference is made to the appended drawings in which:

FIG. 1 is a circuit diagram of the pulsing circuit of this invention, and

FIGS. 2*a*–2*c* is a display of the waveform configurations present in the pulsing circuit.

Referring more particularly to FIG. 1, the pulsing circuit basically includes a capacitor 10 which is charged through a non-oscillatory RLC circuit including resistor 12 and primary winding 14 of transformer 16 serially connected between negative power source 20 and ground 22. In order to insure the non-oscillatory characteristic of the circuitry, it is desirable that the value of the square of resistor 12 be maintained as far above the quadrature of the fractional expression formed by the inductive impedance of primary winding 14 divided by the capacitive impedance of capacitor 10 as is permissible to allow a sufficiently small time constant for the establishment of a full voltage charge upon capacitor 10 during the interval between the termination of one gating pulse output and the initiation of the next output pulse.

Transistor 22 is parallel across capacitor 10 and primary winding 14 with emitter 24 of transistor 22 being grounded and collector 26 being connected to the junction formed by resistor 12 and capacitor 10 thereby forming a resistive free oscillatory loop upon initiation of conduction of transistor 22. A series of preferably rectangular gating pulses are applied to the base 30 of transistor 22 through the series combination of capacitor 32 and resistor 34 while a high impedance biasing resistor 36 is connected between ground 22 and the junction formed by capacitor 32 and resistor 34.

The output of the pulsing circuit is depicted as being employed via output terminal 38 to trigger controlled rectifier 40 into conduction and includes secondary winding 42 of transformer 16, the ends of which winding being connected to the gate 44 and cathode 46 of controlled rectifier 40 through diodes 48 and 50, respectively, while resistor 54, connected between the gate and cathode of controlled rectifier 40, acts as a biasing resistor for the controlled rectifier.

The operation of the pulse forming circuitry is initiated at time T1 by charging capacitor 10, as depicted in the waveform diagrams 2(*a*), to the value of source 20 through resistor 12 and primary winding 14. Because the square of the value of resistor 12 is chosen at a value greater than the quadrature of the fractional component formed by the inductive impedance of transformer winding 14 divided by the impedance of capacitor 10, unidirectional current flows in the charging circuit and a positive potential is produced inductively upon dotted end 56 of secondary winding 42 by the charging current flow through primary winding 14 which positive potential upon end 56 is blocked from the cathode 46 of controlled rectifier 40 by diode 50. The capacitor charging current continues until capacitor 10 is fully charged, as portrayed at time T2.

At time T2, a negative pulse 2(*c*) is applied to the base 30 of transistor 22 to drive the transistor into conduction and form a closed loop for the oscillatory discharge of capacitor 10 through winding 14 in such a direction as to initially produce a sharply rising positive voltage upon end 58 of secondary winding 42, as depicted in FIG. 2*b*. The positive voltage upon end 58 is applied through diode 48 to gate 44 of controlled rectifier 40 thereby triggering the controlled rectifier into conduction and the conduction of the controlled rectifier 40 continues until terminated by any of the squelching means well known in the art for such purpose.

Because the resistive impedance offered to oscillatory current flow within the closed loop by both transistor 22 and primary winding 14 is minute, there is substantially no diminution in the magnitude of the oscillatory pulses and, ideally, the discharging voltage upon capacitor 10 rebounds to a value equal and opposite the voltage of source 20 driven by the propelling force of primary winding 14 tending to maintain the discharge current flow. Reverse current flow through transistor 22 is blocked by the inherent unidirectional current flow characteristic of the transistor and conduction of transistor 22 is terminated.

Upon termination of conduction of transistor 22 at time T3, capacitor 10 is rapidly recharged to the value of source 20 aided by the electromagnetic energy stored within primary winding 14 during the discharge period between T2 and T3 and the circuit remains in such condition until time T4 when a gating signal applied to base 30 of transistor 22 again initiates conduction of the transistor to induce a positive output voltage upon the undotted end 58 of secondary winding 42 thereby gating controlled rectifier 40 into conduction.

Because current continues to flow from source 20 through resistor 12 and transistor 30 to ground during the interval between T2 and T3 when transistor 30 is conducting, for maximum circuit efficiency, the frequency of oscillations within the closed loop should be maintained as high as possible consistent with circuitry requirements. Similarly, the switching speed of the circuit is enhanced by minimizing the value of resistor 12 thereby permitting a greater quantity of charging current to flow in the capacitor charge circuit for a given voltage of source 20.

When a negative going pulse, as characterized by the pulse depicted in FIG. 2(*c*), is utilized to trigger transistor 22 into conduction, the period of pulse application to the transistor will be governed not only by the width of the pulse but also by the time constant, as determined by the values of capacitor 32 and resistor 34, for the charging of blocking capacitor 32 to a value sufficient to terminate conduction of transistor 22. In those situations when the transistor triggering pulse width is small and approximately equal to the period of oscillation of the closed loop discharge current, the time constant formed by resistor 34 and capacitor 32 is preferably fixed at a long interval relative to the triggering pulse width to assure the removal of the conduction bias voltage upon termination of the pulse at time T3. When the triggering pulse applied to transistor 22 has a pulse width of a protracted duration or a termination point lacking coincidence with one half the period of the oscillatory frequency, the values of capacitor 32 and resistor 34 should be so chosen that the time constant for the charging of blocking capacitor 32 to a value sufficient to terminate conduction of transistor 22 is equal to one half the period of the oscillatory circuit. If the application period of the negative triggering pulse biasing transistor 22 is not removed after the first oscillatory half cycle, current drain will occur from voltage source 20 to ground 22 through resistor 12 and transistor 22, thereby lowering the circuit efficiency.

As will be noted from the rapid change in voltage across primary winding 14 depicted in curve 2*b*, in the interval between T2 and T3 during which transistor 22 is energized, a sharply rising pulse will be induced from primary winding 14 to secondary winding 42 to trigger controlled rectifier 40 into conduction, which conduction will continue without further dependency upon the operation of the pulsing circuit until externally applied squelching means terminate the conduction. The non-conducting controlled rectifier will then revert to its initial mode subject to triggering by the pulsing circuit of this invention.

We claim:

1. A circuit comprising a transformer having a primary winding and a secondary winding; a capacitor; means for serially coupling said capacitor and said transformer primary across a voltage source in a non-oscillatory circuit path; unidirectional switching means connected to said non-oscillatory circuit path to provide therewith, when activated, an oscillatory circuit path for discharging said capacitor, said unidirectional switching means being connected to block all current flow in said oscillatory circuit path subsequent to the initial discharge half cycle from said capacitor; output means connected to said transformer secondary to provide an electrical pulse upon an output terminal in response to discharge of said capacitor, and unidirectional current passage means connected to said output means to prevent the charging of said capacitor via said non-oscillatory circuit path from producing a pulse upon said output terminal.

2. A circuit as claimed in claim 1 in which said unidirectional switching means comprises a transistor having its emitter-collector circuit connected across the serial combination of said capacitor and said transformer primary.

3. A circuit as claimed in claim 2 further comprising controlled switching means capable of assuming a conductive state and a nonconductive state, said controlled switching means connected to said output terminal to be caused to assume its conductive state upon occurrence of an electrical pulse on said output terminal.

References Cited

UNITED STATES PATENTS

| | | | |
|---|---|---|---|
| 2,752,500 | 6/1956 | Bruyning | 307—106 |
| 3,021,431 | 2/1962 | Wellman | 307—228 |
| 3,211,915 | 10/1965 | Poehlman et al. | 307—106 |
| 3,375,378 | 3/1968 | Vandemore et al. | 307—107 |

ROBERT K. SCHAEFER, Primary Examiner

D. SMITH, Jr., Assistant Examiner

U.S. Cl. X.R.

307—106, 107